United States Patent [19]
Idel et al.

[11] 4,433,138
[45] Feb. 21, 1984

[54] PROCESS FOR THE PREPARATION OF POLYARYLENE SULPHIDES

[75] Inventors: Karsten Idel; Dieter Freitag; Ludwig Bottenbruch, all of Krefeld; Otto Neuner, Bergisch-Gladbach, all of Fed. Rep. of Germany

[73] Assignee: Bayer Aktiengesellschaft, Leverkusen, Fed. Rep. of Germany

[21] Appl. No.: 379,036

[22] Filed: May 17, 1982

[30] Foreign Application Priority Data

May 22, 1981 [DE] Fed. Rep. of Germany ....... 3120538

[51] Int. Cl.$^3$ .............................................. C08G 75/14
[52] U.S. Cl. ................................... 528/388; 524/718; 524/726
[58] Field of Search ................. 528/388; 524/726, 718

[56] References Cited

U.S. PATENT DOCUMENTS

| | | | |
|---|---|---|---|
| 3,354,129 | 11/1967 | Edmonds, Jr. et al. | 528/388 |
| 4,039,518 | 8/1977 | Campbell | 260/79.1 |
| 4,073,774 | 2/1978 | Quinn | 260/47 UA |
| 4,116,947 | 9/1978 | Edmonds, Jr. et al. | 528/388 |
| 4,282,347 | 8/1981 | Tieszen et al. | 528/388 |
| 4,303,781 | 12/1981 | Idel et al. | 528/388 |
| 4,331,801 | 5/1982 | Idel et al. | 528/388 |
| 4,362,864 | 12/1982 | Idel et al. | 528/388 |

FOREIGN PATENT DOCUMENTS

| | | |
|---|---|---|
| 23313 | 2/1981 | European Pat. Off. . |
| 3030488 | 3/1981 | Fed. Rep. of Germany . |
| 53-33297 | 3/1978 | Japan . |
| 1082817 | 9/1967 | United Kingdom . |

OTHER PUBLICATIONS

Patents Abstracts of Japan, vol. 2, No. 76, p. 946C78 (6/16/78).

*Primary Examiner*—Melvyn I. Marquis
*Attorney, Agent, or Firm*—Connolly and Hutz

[57] ABSTRACT

High molecular weight p-polyarylensulfides having a high melt viscosity, capable of being processed thermoplastically, and have good mechanical properties are produced by reacting components (a), (b), and (c) in a polar solvent with a molar ratio of (a):(c) in the range of 0.85:1 to 1.15:1 and a molar ratio of (c): solvent in the range of 1:2 to 1:15, for a time of up to 10 hours at a temperature of from 160° C. to 300° C., and in the presence of from 2 to 100 mole percent, relative to (c), of an N,N-dialkylcarboxamide;

wherein component (a) is dihalogenobenzene with 50 to 100 mole percent of the formula

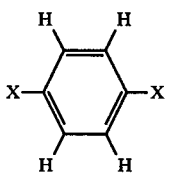

and 0 to 50 mole percent of the formula

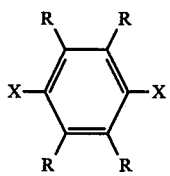

wherein X is fluoro, chloro, bromo or iodo, and R is the same or different and each is selected from the group consisting of hydrogen, alkyl having 1 to 20 carbon atoms, cycloalkyl having 5 to 20 carbon atoms, aryl having 6 to 24 carbon atoms, alkaryl having 7 to 24 carbon atoms, aralkyl having 7 to 24 carbon atoms, and two R moieties linked together forming aryl having 6 to 24 carbon atoms or a heterocyclic moiety having an oxygen, nitrogen or sulphur hetero-atom and having 6 to 24 carbon atoms; with the proviso that at least one R is not hydrogen;

component (b) is 0.1 to 2.4 mole percent, relative to the dihalogenobenzene, of a polyhalogenoaromatic of the formula $ArX_n$ wherein Ar is aryl or a heterocyclic moiety having an oxygen, nitrogen or sulphur heteroatom with said aryl and said heterocyclic each having from 6 to 24 carbon atoms;

X is fluoro, chloro, bromo or iodo; and n is 3 or 4;

and component (c) is alkali metal sulphide.

7 Claims, No Drawings

PROCESS FOR THE PREPARATION OF POLYARYLENE SULPHIDES

Polyarylene sulphides are known (see U.S. Pat. Nos. 2,538,941 and 2,513,188). They can be prepared from the appropriate halogenoaromatics and alkali metal or alkaline earth metal sulphides. The compounds can be reacted in bulk or polar solvents can be concomitantly used. Thus, according to the process described in U.S. Pat. No. 3,354,129, monomeric and polymeric sulphides are obtained by the reaction of at least one cyclic compound, which contains a double bond between adjacent ring atoms, and which is substituted at least by one halogen atom, with an alkali metal sulphide in a polar solvent, such as an amide, a lactam or a sulphone, at elevated temperature. Polyhalogen compounds can be employed as branching compounds.

In DE-AS (German Published Specification) No. 2,453,749, carboxylates are claimed as reaction accelerators and, in addition to alkali metal sulphides, organic thio compounds are also claimed as sulphur donors.

According to DE-OS (German Published Specification) 2,623,363 or U.S. Pat. No. 4,038,261, lithium chloride or lithium carboxylate are employed as catalysts for the preparation of arylene sulphide polymers. N-Methylpyrrolidone and alkali metal hydroxides complete the catalyst system.

According to U.S. Pat. No. 4,038,259, alkali metal carbonates in combination with alkali metal carboxylates, and according to U.S. Pat. No. 4,038,263 lithium halides, are employed as catalysts for the polyphenylene sulphide preparation.

According to DE-OS (German Published Specification) 2,623,362 or U.S. Pat. No. 4,038,262, lithium halides or alkali metal carboxylates are used as catalysts for the preparation of arylene sulphide polymers. N-Methylpyrrolidone and alkali metal hydroxides complete the catalyst system.

According to DE-OS (German Published Specification) 2,623,333 or U.S. Pat. No. 4,064,114, lithium acetate is used as a catalyst for the preparation of arylene sulphide polymers. N-Alkylpyrrolidones, and if appropriate alkali metal hydroxides and/or alkali metal carbonates as bases, complete the catalyst system. Alkali metal sulphonates are claimed in U.S. Pat. No. 4,038,260, and lithium carbonate and lithium borate are claimed in U.S. Pat. No. 4,039,518.

Polyarylene sulphides with a reduced melt fluidity can be obtained using tri-alkali metal phosphate catalysts (DE-OS (German Published Specification) No. 2,930,710) or alkali metal phosphonate catalysts (DE-OS (German Published Specification) No. 2,930,797).

In DE-OS (German Published Specification) No. 2,623,333, the dehydration customarily carried out before the reaction with dihalogenoaromatics in the polar solvent is carried out in two stages. The hydrate of the catalyst lithium acetate is first dehydrated and subsequently, in the second step, the sodium sulphide hydrate.

In general, the p-polyphenylene sulphides are subjected to a further hardening or curing step subsequent to the reaction (for example U.S. Pat. No. 3,717,620, U.S. Pat. No. 3,524,835 and U.S. Pat. No. 3,839,301), in which step it is intended to improve the properties via chain-lengthening reactions and branching reactions. Without this hardening step, the p-polyphenylene sulphides possess, in general, only a low melt viscosity, which does not permit thermoplastic processing.

According to U.S. Pat. No. 3,919,177, it is intended, under selected conditions, with the aid of the catalyst lithium carboxylate, to achieve the possibility of melt-spinning the p-polyphenylene sulphide produced, without previous hardening, to give fibres. In U.S. Pat. No. 4,116,947 or DE-OS (German Published Specification) No. 2,817,731, it is intended, by means of a particular quantity of residual water, and if appropriate in the presence of carboxylates, to achieve the possibility of spinning and extruding the resulting p-polyphenylene sulphides to give fibres, and of moulding the p-polyphenylene sulphides, without a hardening step.

The invention is based on recognition of the fact that branched polyarylene sulphides with a high melt viscosity and a high molecular weight are obtained if polyhalogenobenzenes and alkali metal sulfides are condensed, in a manner which is in itself known, in lactams, preferably N-alkyl-lactams, and the reaction is carried out in the presence, in addition, of 0.02 to 1.0 mol (relative to 1 mol of alkali metal sulphide) of an N,N-dialkyl-carboxamide. The resulting polyarylene sulphides can be moulded, extruded and spun into fibres, without after-treatment for hardening. They have, in comparison to the polyarylene sulphides hitherto commercially available, considerably improved mechanical properties, in particular a very high impact strength.

The process according instant invention is improved over those of the German Published Specifications No. 2,930,710 and No. 2,930,797, because no metal salt catalyst is necessary.

The subject of the invention is a process for the preparation of branched high molecular weight polyarylene sulphides having a high melt viscosity between $0.5 \times 10^3$ and $5 \times 10^5$ Pa.s, which is characterised in that (a) dihalogenobenzenes, of which 50 to 100 mol % correspond to the formula (I)

(I)

and 0 to 50 mol % correspond to the formula (II)

(II)

wherein
X is fluorine, chlorine, bromine and iodine, preferably chlorine and bromine, and
R is identical or different and can be hydrogen, $C_1$–$C_{20}$-alkyl, $C_5$–$C_{20}$-cycloalkyl, $C_6$–$C_{24}$-aryl, $C_7$–$C_{24}$-alkaryl or $C_7$–$C_{24}$-aralkyl, and/or two radicals R can be linked to give an aromatic or heterocyclic ring, and at least one radical R is always different from hydrogen, and (b) 0.1 to 2.4 mol %, preferably 0.4 to 2.0 mol %, relative to the dihalogenobenzenes, of a polyhalogenoaromatic of the formula (III)

$$ArX_n \tag{III}$$

wherein

Ar is an aromatic or heterocyclic radical having 6 to 24 C atoms and at least 3 free valencies, X has the same meaning as in formula (I) and, (II), and n is 3 or 4, (c) an alkali metal sulphide, preferably sodium or potassium sulphide or a mixture thereof, preferably in the form of the hydrates or aqueous mixtures, if appropriate together with alkali metal hydroxides, in a (d) lactam, particularly an N-alkyl lactam, without further metal salt catalyst, are reacted, the molar ratio of (a) to (c) being in the range of from 0.85:1 to 1.15:1, preferably from 0.95:1 to 1.05:1, and of (c) to (d) in the range of from 1:2 to 1:15, a polycondensation time of up to 10 hours, preferably of from 0.2 to 5 hours, and a polycondensation temperature of from 160° to 300° C., preferably between 200° and 285° C., being maintained, the improvement comprises reacting the components (a), (b) and (c) in the presence of from 2 to 100 mol %, preferably from 2 to 50 mol % (relative to alkali metal sulphide), of N,N-dialkylcarboxamides. Suitable N,N-dialkylcarboxamides are those of the formula (IV)

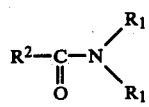

(IV)

wherein $R^1$ is the same or different alkyl having 1 to 6 carbon atoms and $R^2$ is alkyl having 1 to 18 carbon atoms, or aryl having 6 to 12 carbon atoms.

Particularly suitable are N,N-dimethyl- and N,N-diethylcarboxamides of $C_1$-$C_{18}$ aliphatic and $C_6$-$C_{12}$ aromatic carboxylic acids, preferably of $C_1$-$C_{18}$ aliphatic carboxylic acids and particularly preferably of $C_1$-$C_4$ aliphatic carboxylic acis.

In general, the alkali metal sulphide which is present as the hydrate is partially dehydrated before the reaction, preferably carried out in pressure containers, with the p-dihalogeno compounds of the formula (I) and (II) and the polyhalogeno compounds of the formula (III).

The alkali metal sulphide can be dehydrated in one step or several partial steps, for example by distilling off the water from the reaction solution. The dehydration should be completed before the addition of the p-dihalogeno compounds of the formula (I) and (II) and of the polyhalogeno compounds of the formula (III).

In a preferred manner of carrying out the reaction, the alkali metal sulphide hydrate is initially introduced, either into the N,N-dialkylcarboxamide or a mixture of the N,N-dialkylcarboxamide, together with a lactam, very particularly preferably an N-alkyl lactam, and the dehydration is carried out.

It is also possible to carry out the dehydration in the N-alkyl lactam, and to add the N,N-dialkylcarboxamide during or after the dehydration.

In general, the N,N-dialkylcarboxamide is added before the reaction of the alkali metal sulphides with the compounds of the formula (I), (II) and (III).

The combination of reactants can be effected, in principle, in any desired form. The p-dihalogenoaromatics of the formula (I) and (II) and the polyhalogenoaromatics of the formula (III) can be added together or separately, continuously, in portions or directly in one charge to the alkali metal sulphide, the solvent or a part thereof, and the N,N-dialkylcarboxamide. However, it is also possible to meter the alkali metal sulphide, together with the solvent or a part thereof, and the N,N-dialkyl acid amide into the compounds of the formulae (I), (II) and (III). It is also possible to directly combine all the reactants. Any other combination of the reactants is also possible.

The alkali metal sulphides, preferably potassium and sodium sulphide, are preferably employed in the form of their hydrates or aqueous mixtures. However, they can also be directly prepared in the reaction solution, according to a stoichiometric reaction, from hydrogen sulphide and the appropriate alkali metal hydroxides or from the alkali metal hydrogen sulphides and the corresponding alkali metal hydroxides. Mixtures of the alkali metal sulphides can also be employed.

According to the proportion of alkali metal hydrogen sulphide in the reaction solution, which alkali metal hydrogen sulphide is contained as an impurity in the alkali metal sulphide or is formed during the course of the reaction, alkali metal hydroxide is additionally stoichiometrically metered into the mixture in order to regenerate alkali metal sulphide. If appropriate, it is also possible to add, instead of the alkali metal hydroxides, those compounds which split off or form alkali metal hydroxides under the reaction conditions.

Lithium, sodium, potassium and rubidium sulphide, preferably sodium and potassium sulphide, are employed, for example, as the alkali metal sulphides. Mixtures of the alkali metal sulphides can also be used.

Lithium hydroxide, sodium hydroxide and potassium hydroxide, as well as mixtures thereof, are suitable examples of alkali metal hydroxides.

Examples of p-dihalogenoaromatics to be employed according to the invention, of the formula (I), are: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They can be used alone or in a mixture with one another. Preferred are p-dichloro benzene and p-dibromo benzene.

Examples of the p-dihalogenaromatics to be employed according to the invention, of the formula (II), are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. They can be used alone or in a mixture with one another.

Examples of the polyhalogenoaromatics to be employed according to the invention, of the formula (III), are: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2',4,4'-tetrachlorobiphenyl and 1,3,5-trichlorotriazine.

Lactams in the context of the present invention are those which are derived from aminoacids having 3 to 5 C atoms, which can optionally carry substituents at the carbon framework, and which are inert under the reaction conditions, such as, for example, an alkyl radical having 1 to 5 C atoms.

N-alkyl lactams in the context of the present invention are defined as for the lactams according to the invention, but in addition carry, at the nitrogen atom, an alkyl radical having 1 to 6 C atoms.

The following are examples of suitable solvents: caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxo-hexamethyleneimine and N-ethyl-2-oxo-hexamethyleneimine.

It is also possible to choose mixtures of the above solvents.

The following are examples of suitable N,N'-dialkylcarboxamides: N,N-dimetnylacetamide; N,N-diethylacetamide; N,N-dipropylacetamide; N,N-diisopropylacetamide; N-methyl-N-ethylacetamide; N,N-dimethylpropionamide; N,N-diethylpropionamide; N,N-dimethylisopropionamide, N,N-dimethylbenzamide, N,N-diethylbenzamide and N,N-dimethylstearylamide.

The condensation temperature is, as a rule, 160° to 300° C., preferably 200° to 285° C. The reaction time can be up to 10 hours, but is preferably between 0.2 and 5 hours. A stepwise increase in the reaction temperature during this time is of advantage. Because the condensation temperature is generally higher than the boiling point of the solvent mixture, the application of additional pressure is automatically necessary.

The dihalogenobenzene and the alkali metal sulphide are reacted, as far as possible, in equimolar quantities. Accordingly, the molar ratio of dihalogenobenzene/alkali metal sulphide is preferably in the range of from 0.95:1 to 1.05:1. However, it can be extended to the range of 0.85:1 to 1.15:1.

The polyhalogenoaromatics to be employed according to the invention, of the formula (III), can be added, together with the p-dihalogenobenzenes or separately, according to experimental conditions, in a quantity of up to several mol %, relative to the proportion of dihalogenobenzene, but, as a rule, a proportion of from 0.1 to 2.4 mol %, preferably from 0.4 to 2.0 mol %, relative to the proportion of dihalogenobenzene, will be sufficient.

The quantity of lactam can be chosen within a wide range, but is, in general, 2 to 15 mols per mol of alkali metal sulphide.

The working-up of the reaction mixture can be effected in a variety of ways.

The polyarylene sulphide can be separated off, according to customary procedures, for example by filtration or by centrifuging, directly from the reaction solution, or only after the addition, for example, of water and/or dilute acids.

In general, the filtration is followed by washing with water in order to remove inorganic constituents which can adhere to the polymers, such as, for example, residues of alkali metal sulphides and alkali metal chlorides.

A wash or extraction with other wash liquids, which can also be carried out additionally or subsequently to this wash, is naturally also possible.

The polymer can also be obtained by stripping off the solvent from the reaction space, followed by a wash as described above.

The polyarylene sulphides according to the invention can also be mixed with other polymers, and with pigments and fillers, such as, for example, graphite, metal powder, glass powder, quartz flour or glass fibres, or additives which are customary for polyarylene sulphides, such as, for example, customary stabilisers or mould release agents, can be added to the polyarylene sulphides according to the invention.

In general, the melt fluidity of polyarylene sulphides is measured according to ASTM 1238-70, at 316° C. using a 5 kg weight, and is given in g/10 min.

However, for high melt flow values, this measurement can cause difficulties owing to the high discharge rate of the polymer melt.

The melt viscosity $\eta_m$ of the polymer melt (in Pa.s) was therefore determined, with the aid of the Instron rotation viscometer, at 306° C. as a function of the shearing force $\tau$ (in Pa).

In this manner, it is possible to precisely determine the melt viscosity in a very wide range of from $10^{-1}$ to $10^7$ Pa.s. In the Instrom rheometer, the polymer is melted between a fixed plate and a rotatable ball, and the torque of the ball is determined. From the torque, the angular velocity and the data of the apparatus, the melt viscosity can be calculated as a function of the shearing force. The rheometer model 3250 of Messrs. Instron was used; diameter of the ball and of the plate 2 cm.

The melt viscosity which is measured at a shearing force of $\tau = 10^2$ Pa is given.

In general, the p-polyarylene sulphides according to the invention have, directly after isolation from the reaction mixture, melt viscosities of from $0.5 \times 10^3$ to $5 \times 10^5$ Pa.s and higher, preferably, however, of some $1.5 \times 10^3$ to $5 \times 10^4$ Pa.s. They can be directly processed, by extrusion, blow extrusion, injection moulding or other customary processing techniques, to give sheets, mouldings or fibres, which can be used in the customary manner as car components, fittings, components of electrical equipment, for example switches, and electronic panels, chemical-resistant components and apparatuses, such as pump housings and impeller wheels of pumps, dishes for corrosive baths, packing rings, components of office machines and communication equipment, as well as domestic appliances, valves, ballbearing parts etc.

EXAMPLE 1

This example describes, for comparison, the preparation of polyphenylene sulphide according to U.S. Pat. No. 3,354,129.

129 g of sodium sulphide trihydrate (corresponding to 1 mol of Na$_2$S) and 300 g of N-methyl-2-pyrrolidone were combined in an autoclave equipped with a stirrer. The mixture was flushed with nitrogen and slowly warmed to 202° C. A total of 19 ml of water distilled off during this process. The mixture was then cooled down to approx. 160° C., and 147 g of p-dichlorobenzene (=1 mol) in approx. 50 g of N-methyl-2-pyrrolidone were added. The reaction mixture is warmed, under the initial nitrogen pressure of 2.5 bars, to 245° C. in 30 minutes, the pressure increasing to 10 bars, and this temperature is maintained for 3 hours. After the mixture has cooled to room temperature, a grey solid is isolated and is then subjected to careful washing with water in order to remove the inorganic contaminants.

The solid is dried at 80° C. in vacuo and 100.3 g (93%) of poly-p-phenylene sulphide with the following characteristic data are obtained: melt viscosity $\eta m = 4.5$ Pa.s (at $\tau = 10^2$ Pa). Thermoplastic processing is not possible without hardening.

EXAMPLE 2

13.06 g of dimethylacetamide (0.15 mol), 129 g of sodium sulphide trihydrate (=1.0 mol of Na$_2$S) and 300 g of N-methyl-2-pyrrolidone are slowly heated to 175° C. in an autoclave equipped with a stirrer and distillation attachment, 8 ml of distillate which consists for the most part of water being collected.

An appropriate stoichiometric quantity of sodium hydroxide, as a finely ground powder, is thereafter added in order to neutralise sodium hydrogen sulphide, and the mixture is left at 175° C. for a further short period.

142.6 g of p-dichlorobenzene (0.97 mol) and 1.4 g of 1,2,4-trichlorobenzene (0.08 mol) in 150 g of N-methyl-2-pyrrolidone are then metered in and the mixture is heated up from 200° C. to 269° C. during the course of 90 minutes, and is left at this temperature for 120 minutes. After the end of the reaction, the mixture is allowed to cool to 150° C., the pressure is released and the reaction mixture is removed. The resulting p-polyphenylene sulphide is separated off and is carefully freed from adhering salts, using water. The p-polyphenylene sulphide is isolated as a grey-white solid after it has been dried. Melt viscosity $\eta m = 2,650$ Pa.s (at $\eta = 10^2$ Pa).

EXAMPLE 3

This example was carried out as for Example 2, but 0.25 mol of dimethylacetamide were employed: $\eta m = 3,150$ Pa.s (at $\tau = 10^2$ Pa).

EXAMPLE 4

As in Example 2, but using 0.15 mol of diethylacetamide instead of dimethylacetamide:

$\eta m = 2,800$ Pa.s (at $\tau = 10^2$ Pa).

EXAMPLE 6

774.0 g of sodium sulphide trihydrate (6.0 mols of Na$_2$S) and 800 g of N-methyl-2-pyrrolidone are initially introduced into the reaction vessel at 130° C. and 78.4 g of dimethylacetamide (0.9 mol) are slowly added. The mixture is then heated up to 160° C. and 120 ml of distillate, which consists for the most part of water, are collected. After sodium hydroxide has been further metered in in a quantity corresponding to the quantity of sodium hydrogen sulphide present, 855.6 g (5.82 mols) of p-dichlorobenzene and 10.56 g of 1,2,4-trichlorobenzene (0.058 mol) in 1,600 g of N-methyl-2-pyrrolidone are added and the mixture is heated up to 200° C., brought to 268° C. during the course of 90 minutes and kept at this temperature for 150 minutes. The resulting grey-white p-polyphenylene sulphide is isolated and worked up as in Example 2.

$\eta m = 4,200$ Pa.s (at $\tau = 10^2$ Pa).

EXAMPLE 7

As in Example 6, but using 0.20 mol of dimethylacetamide and 0.08 mol of 1,2,4-trichlorobenzene per mol of Na$_2$S.

$\eta m = 3,850$ Pa.s (at $\tau = 10^2$ Pa).

EXAMPLE 8

As in Example 6, but a mixture of 66.6% by weight of N-isopropyl-2-pyrrolidone and 33.4% by weight of N-methyl-2-pyrrolidone is employed instead of pure N-methyl-2-pyrrolidone.

$\eta m = 1,870$ Pa.s (at $\tau = 10^2$ Pa).

EXAMPLE 9

As in Example 6, but 0.12 mol of 1,2,4-trichlorobenzene per mol of Na$_2$S are employed.

$\eta m = 6,700$ Pa.s (at $\tau = 10^2$ Pa).

The mechanical properties of the p-polyphenylene sulphide of Examples 6 and 7 were determined and compared with those of a commercial thermoplastically processable p-polyphenylene sulphide (Ryton P4 of the Phillips Petroleum Comp.). The result is shown in Table 1 which follows.

TABLE 1

| Property | Unit of measurement | Testing instructions | Commercial product | p-polyphenylene sulphide according to Example 6 | according to Example 7 |
|---|---|---|---|---|---|
| Tensile strength | MPa | DIN 53,455 | 43.6 | 45.1 | 42.3 |
| Elongation at break | % | DIN 53,455 | 0.9 | 10.1 | 10.6 |
| Tensile modulus of elasticity | MPa | DIN 53,455 | 4,400 | 3,400 | 3,240 |
| Flexural strength | MPa | DIN 53,452 | 77.8 | 116.0 | 123.0 |
| Flexural modulus of elasticity | MPa | DIN 53,452 | 3,820 | 3,730 | 4,170 |
| Ball indentation hardness | MPa | DIN 53,456 | 64.7 | 144.4 | 154.0 |
| Impact | kJ/m$^2$ | DIN 53,453 | 3.5 | 26.3 ! | 26.6 ! |

TABLE 1-continued

| Property | Unit of measurement | Testing instructions | Commercial product | p-polyphenylene sulphide according to Example 6 | p-polyphenylene sulphide according to Example 7 |
|---|---|---|---|---|---|
| strength | | | | | |
| Notched impact strength | kJ/m² | DIN 53,453 | 0.9 | 1.3 | 1.2 |
| Melt viscosity (at $\tau = 10^2$ Pa) | Pa.s | | 4,100 | 4,200 | 3,850 |

In the case of the elongation at break, the ball indentation hardness and, in particular, the impact strength, the clearly improved level of the p-polyphenylene sulphide according to the invention, in comparison to the commercial thermoplastic p-polyphenylene sulphide, is evident.

What is claimed is:

1. In the process for preparation of high molecular weight thermoplastic branched polyarylene sulphide having a melt viscosity between $0.5 \times 10^3$ and $5 \times 10^5$ Pa.s by reacting halogenoaromatic compounds with alkali metal sulphides, the improvement comprises reacting components (a), (b) and (c) in a lactam without further metal salt catalyst with a molar ratio of (a):(c) in the range of 0.85:1 to 1.15:1 and a molar ratio of (c): solvent in the range of 1:2 to 1:15, for a time of up to 10 hours at a temperature of from 160° C. to 300° C., and in the presence of from 2 to 100 mole percent, relative to (c), of an N,N-dialkylcarboxamide;

wherein component (a) is dihalogenobenzene with 50 to 100 mole percent of the formula

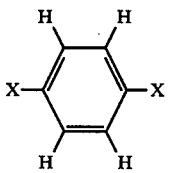 (I)

and 0 to 50 mole percent of the formula

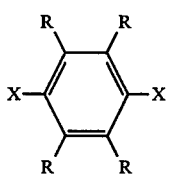 (II)

wherein X is fluoro, chloro, bromo or iodo, and R is the same or different and each is selected from the group consisting of hydrogen, alkyl having 1 to 20 carbon atoms cycloalkyl having 5 to 20 carbon atoms, aryl having 6 to 24 carbon atoms, alkaryl having 7 to 24 carbon atoms, aralkyl having 7 to 24 carbon atoms, and two R moieties linked together forming aryl having 6 to 24 carbon atoms or a heterocyclic moiety having an oxygen, nitrogen or sulphur hetero-atom and having 6 to 24 carbon atoms; with the proviso that at least one R is not hydrogen;

component (b) is 0.1 to 2.4 mole percent, relative to the dihalogenobenzene, of a polyhalogenoaromatic of the formula $$ArX_n \qquad (III)$$

wherein

Ar is aryl or a heterocyclic moiety having an oxygen, nitrogen or sulphur heteroatom with said aryl and said heterocyclic each having from 6 to 24 carbon atoms;

X is fluoro, chloro, bromo or iodo; and n is 3 or 4;

and component (c) is an alkali metal sulphide.

2. The process according to claim 1 wherein component (a) is p-dichlorobenzene or p-dibromobenzene.

3. The process according to claim 1 wherein component (b) amounts to 0.4 to 2.0 mole percent, relative to component (a).

4. The process according to claim 1 wherein the amount of N,N-dialkylcarboxamide is 2 to 50 mole percent, relative to component (c).

5. The process according to claim 1 wherein the N,N-dialkylcarboxamide is of the formula

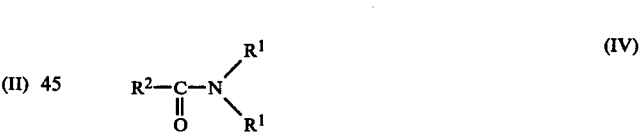 (IV)

wherein $R^1$ is the same or different alkyl having 1 to 6 carbon atoms and $R^2$ is alkyl having 1 to 18 carbon atoms, or aryl having 6 to 12 carbon atoms.

6. The process according to claim 5 wherein each $R^1$ is either methyl or ethyl.

7. The process according to claim 1 wherein the lactam is an N-alkyl lactam having 3 to 5 lactam ring carbons and 1 to 6 carbon atoms in the N-alkyl moiety.

* * * * *